US006190026B1

(12) United States Patent
Moore

(10) Patent No.: US 6,190,026 B1
(45) Date of Patent: Feb. 20, 2001

(54) ILLUMINATED AUTOMOTIVE EMBLEM

(75) Inventor: Matthew Glen Moore, Rhoadesville, VA (US)

(73) Assignee: Matthew G. Moore, Rhoadesville, VA (US)

( * ) Notice: Under 35 U.S.C. 154(b), the term of this patent shall be extended for 0 days.

(21) Appl. No.: 09/385,679

(22) Filed: Aug. 30, 1999

Related U.S. Application Data

(63) Continuation-in-part of application No. 08/957,161, filed on Oct. 24, 1997, now abandoned.

(51) Int. Cl.[7] .................................................. B60Q 9/00

(52) U.S. Cl. .......................... 362/487; 362/459; 362/496; 362/505; 362/506; 362/540

(58) Field of Search .............................. 362/31, 559, 459, 362/487, 496, 505, 506, 540, 84, 103, 104, 105, 116, 800, 806, 812

(56) References Cited

U.S. PATENT DOCUMENTS 4,977,695 * 12/1990 Armbruster ............................ 40/541

* cited by examiner

*Primary Examiner*—Sandra O'Shea
*Assistant Examiner*—Ismael Negron

(57) ABSTRACT

An illuminated automotive emblem for mounting on a vehicle. The emblem has a decorative housing frame with an overall shape preferably similar to existing automotive manufacturer's emblems (Ford, Chevrolet, etc.). The frame has a central open area that surrounds indicia on a display template that may be any type of printed matter. A portion of the display template substantially fills the central open area of the frame. A rear enclosure housing an illuminant mounts behind the template to emit light through the display template and indicia. The housing frame, display template, rear enclosure and illuminant disassemble from each other so that the parts are replaceable and various housing frames and indicia can be displayed. The housing frame and rear enclosure fasten internally through the use of adhesive strips, magnetic material or interior studs that mate to open bores. The interior studs and open bores are of such dimension that a "snap" tight frictional type bond is created. With all exterior threaded fasteners removed, the housing frame can be removed from the rear enclosure by applying slight force to overcome the internal fastening. With the housing frame removed, the display template and illuminant can be disassembled and replaced without removing the entire emblem from the supporting vehicle surface. Threaded fasteners or adhesive strips located on the rear surface of the rear enclosure are used to attach the emblem to the vehicle.

11 Claims, 5 Drawing Sheets

ILLUMINATED AUTOMOTIVE EMBLEM

This is a Continuation in Part Application of application Ser. No. 08/957.161 filed Oct. 24, 1997 now abandoned.

BACKGROUND OF THE INVENTION

1. Field of the Invention

The present invention relates to an illuminated emblem for a motor vehicle and, more specifically to an emblem including a translucent display template that is illuminated from behind by a light source. The emblem consists of internal and external fasteners that allow the illuminant, display template and other main components to be replaced without removing the entire device from the supporting vehicle surface.

2. Description of the Related Art

A number of illuminated displays or emblems for the exterior of automotive vehicles have been designed. None of the known devices, however, provide an easy and fast assembly such that, once attached, the components, indicia and light source can be replaced without the requirement of detaching the entire device from the supporting surface. U.S. Pat. No. 4,556,932 issued on Dec. 3, 1985 to Lehrer et al, discloses a lighted novelty item that includes a battery powered LED with a prism lens for illuminating a transparent portion of a face plate. The novelty item is not configured to be attached to an automobile. U.S. Pat. No. 4,965,950 issued on Oct. 30, 1990 to Yamada shows a display device for an automotive mark plate which incorporates a means of illumination disposed behind an indicia-bearing planar element. U.S. Pat. No. 4,977,487 issued on Dec. 12, 1990 to Okano discloses a face-brightening device for use with vehicles. FIG. 14 shows the means of illumination incorporated into the logo/emblem of a vehicle. U.S. Pat. No. 5,075,826 issued on Dec. 24, 1991 to Lan, discloses an auxiliary brake lamp that illuminates a transparent faceplate. U.S. Pat. No. 5,424,924 issued on Jun. 13, 1995 to Ewing et al. discloses an illuminated vehicle bra that includes a number of light sources for transferring a message. U.S. Pat. No. 5,461,548 issued on Oct. 24, 1995 to Esslinger et al. discloses a fiber optic illuminated panel that can be mounted on the side of a vehicle. U.S. Pat. No. 4,603,065 issued on Jul. 29, 1986 to Mori et al. describes a decorative part that can be used for illuminating emblems. However, the device is not constructed such that the display, illuminant and other components are easily replaced. U.S. Pat. No. 4,645,970 issued on Feb. 24, 1987 to Murphy discloses an illuminated panel assembly that can be used on vehicles. U.S. Pat. No. 4,977,695 issued on Dec. 18, 1990 to Armbruster discloses a device that can be used for illumination of a vehicle emblem and is constructed so that the components are replaceable. However, the device does not consist of internal type fasteners so that the components are replaceable without entirely removing the device from the supporting surface of a vehicle.

SUMMARY OF THE INVENTION

The present invention is an illuminated automotive emblem for mounting on a vehicle. The emblem has a housing frame component with a central opening that creates a picture frame or bordering effect. The overall shape of the emblem may be oval, circular, rectangular or any desired shape, but is preferably similar in shape to existing automotive emblems (Ford, Chevrolet, etc.) to create an asthetic appeal by appearing to be factory installed. The frame component surrounds indicia on a display template component that may include any type of printed matter (i.e. symbols personal names, brand names, etc.). The display template fills the open area of the housing frame component. A rear enclosure component, with a detachable illuminant on the interior face, mounts behind and transmits light through and illuminates the translucent portions of the display template component. The housing frame, display template, rear enclosure components and the illuminant disassemble from each other and make them replaceable. The display template can be replaced for the illumination of various indicia. A plurality of interior fasteners, consisting of adhesive materials, magnetic materials or plastic studs mated to interior bores, in combination with exterior and interior screws are provided for assembly device. Once the exterior screws are removed, the bonding of the interior fasteners can be overcome by slight force to remove the housing frame component from the rear enclosure component. With the housing frame component removed, the display template component and illuminant can be removed and replaced without the need of removing the rear enclosure from the supporting vehicle surface. The exterior screws are positioned such that they are blind or relatively unnoticeable in relation to a frontal or top view, which caters to the asthetic quality of the emblem device. The screw fasteners are used in conjunction with countersunk bores. For attaching the emblem device to a vehicle surface, a plurality of threaded fasteners or adhesive strips are provided. The threaded fasteners and adhesive strips are attached to or molded as part of the rear facing of the rear enclosure component. In the case of the threaded studs, mating nuts are applied to the free ends after having been projected through holes in the vehicle support surface. The adhesive strips can attach directly to the supporting surface. The illuminant placed completely or partially interior to the assembled device is preferably an electroluminescent (EL) lamp, but can also be incandescent bulbs, fluorescent or other type gas filled tubes or fiber optic. Current needed for illumination is provided by attaching wires from the illuminant leads to some point of the vehicles wiring system. When the illuminant is an EL lamp, a transformer type device is attached at some point along the wiring between the lamp and vehicle wiring system. The transformer device allows for increasing the voltage supply from the vehicle so that the EL lamp can be illuminated. A switch can optionally be mounted interiorly or exteriorly to the device.

Accordingly, a principal object of the invention is to provide an illuminated emblem for a vehicle that has components and an illuminant that are replaceable without the need of removing the entire device from the supporting vehicle surface.

DETAILED DESCRIPTION OF THE PREFERRED EMBODIMENT

Figure 1:
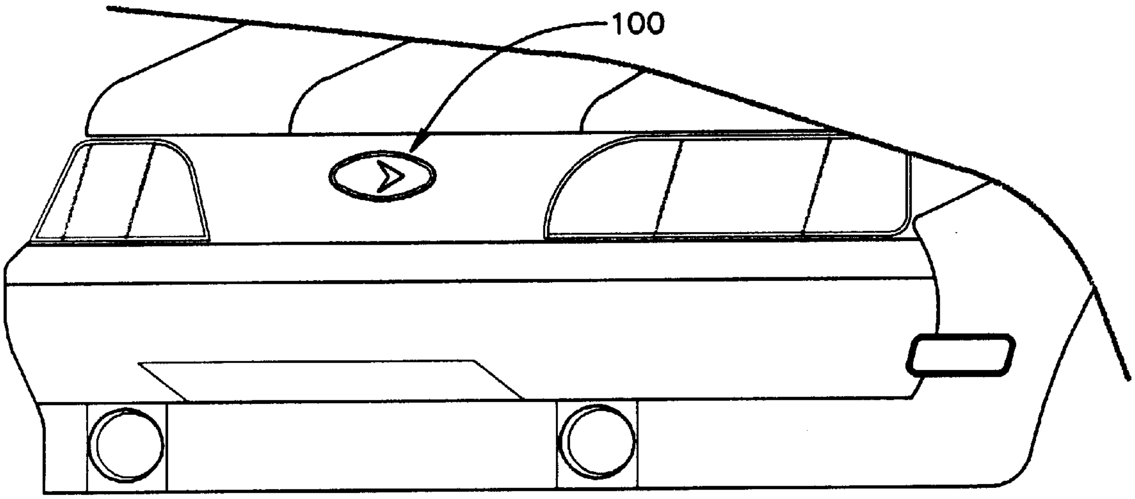
FIG. 1 is a view of the emblem device attached to a vehicle surface.

The present invention is an illuminated emblem 100 for the purpose of attaching to a vehicle A as shown in FIG. 1.

Figure 2:
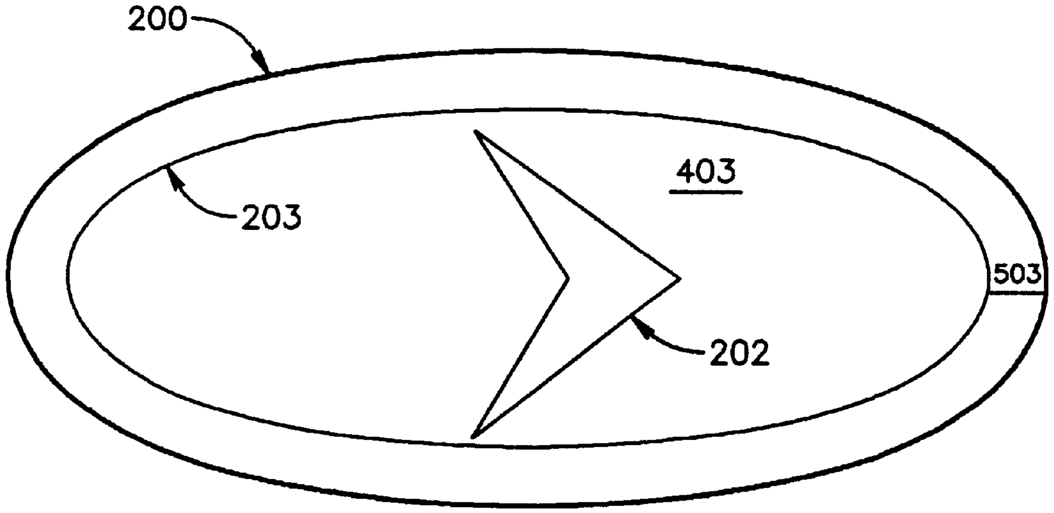
FIG. 2 is a closer front view of the emblem device.

A closer front view of the emblem 100 is shown in FIG. 2. The front surface 503 of the housing frame 200 surrounds the displayed indicia 202 displayed on the raised portion 403 of the display template 401. The displayed indicia 202 can be any type of printed matter (i.e. symbols, personal names, brand names, etc.).

The details of the emblem 100 are provided in FIGS. 3–6.

Figure 3:
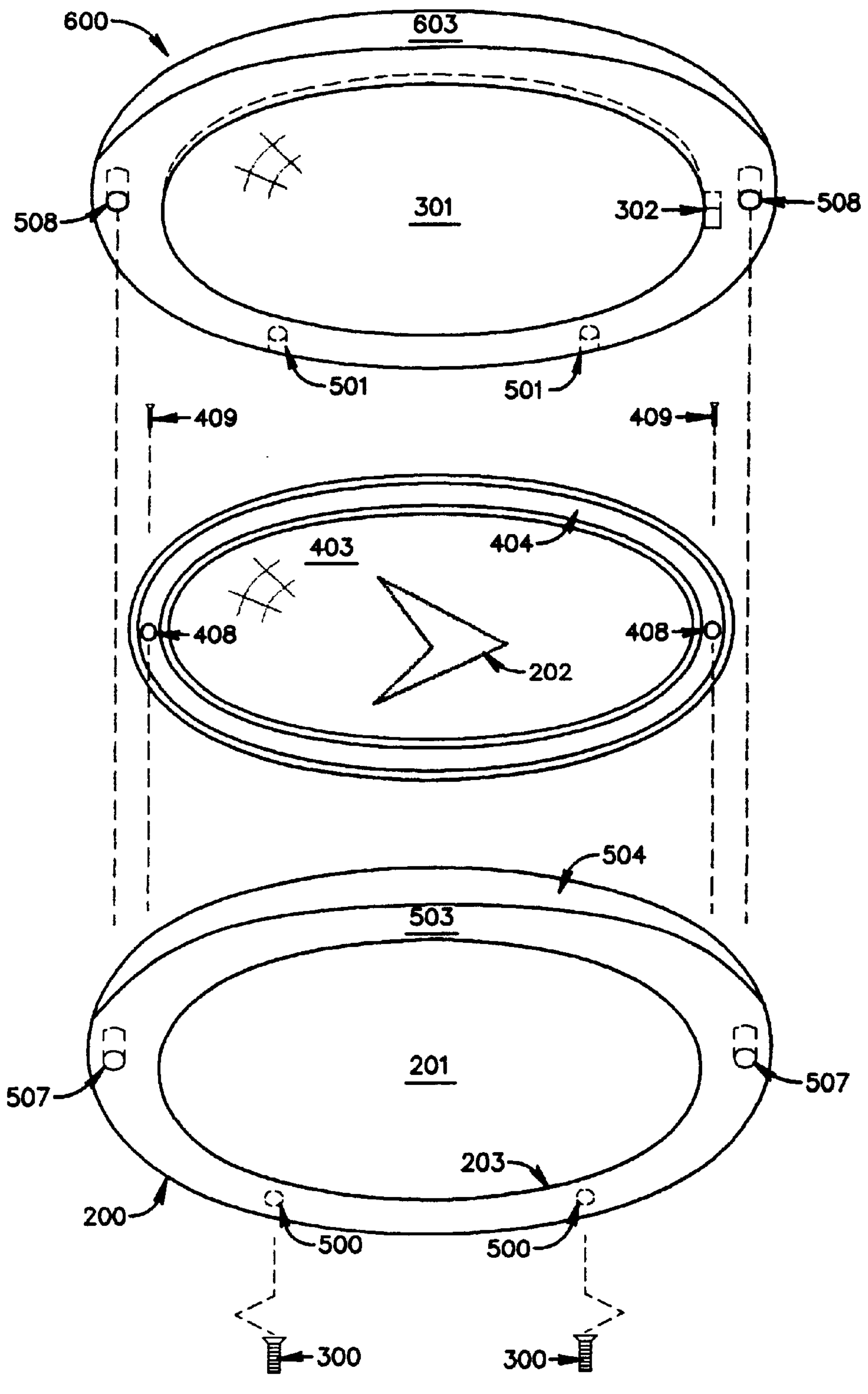
FIG. 3 is peripheral view of the main components of the device in detached positions.
Figure 6:
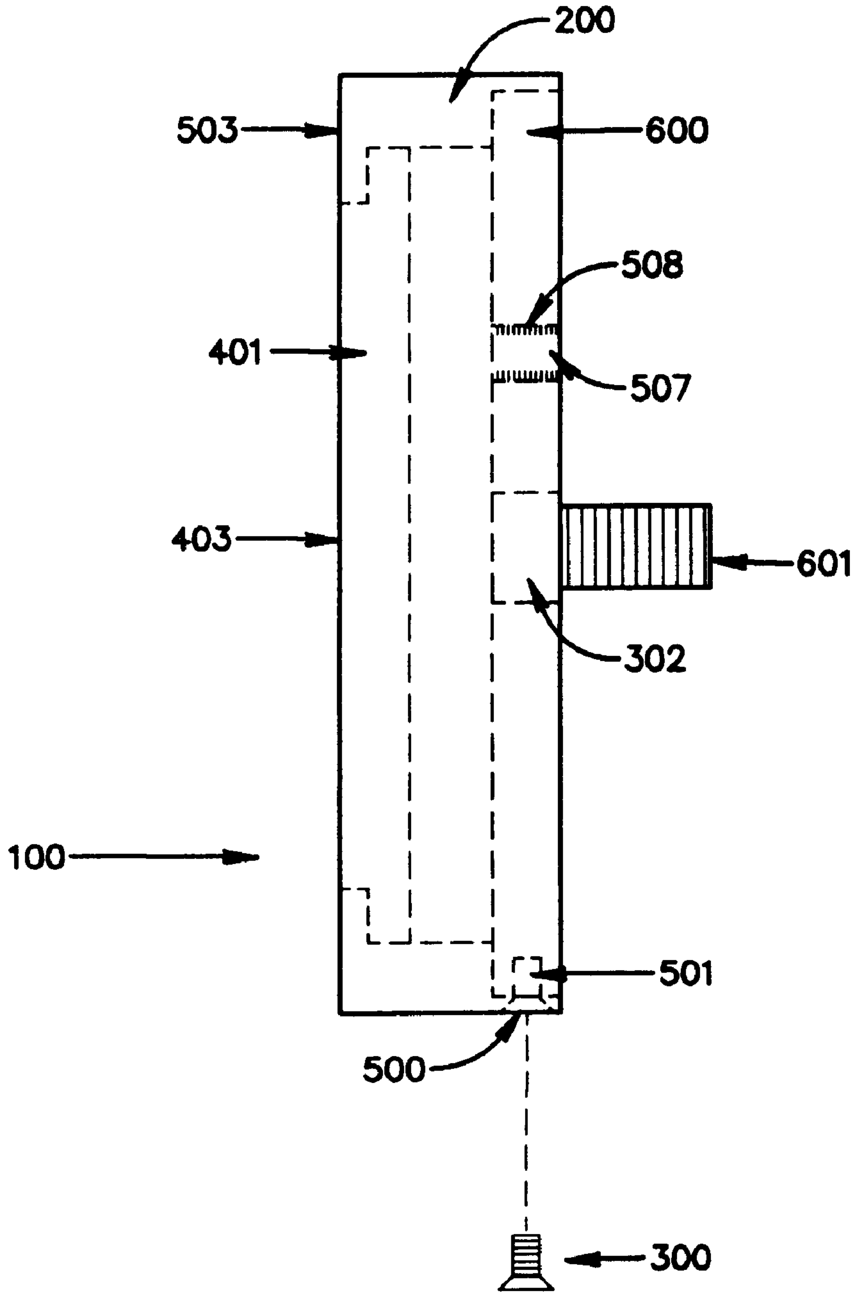
FIG. 6 is a side view of the main components of the emblem in attached positions.

As indicated in FIGS. 3 and 6, the emblem 100 consists of three main components: a housing frame 200 with an open area 201, a display template 401 with indicia 202 and a rear enclosure 600 that houses an illuminant 301.

Figure 4:
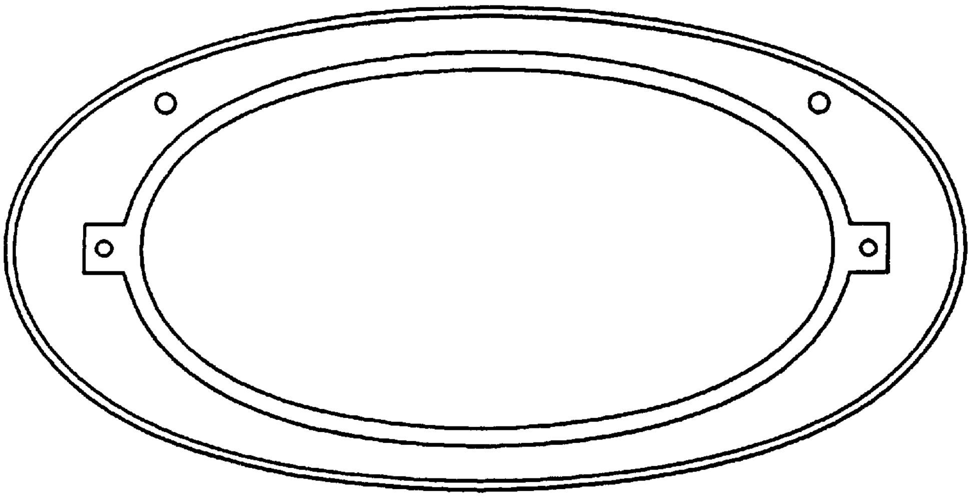
FIG. 4 is a rear view of the housing frame component.
Figure 5:
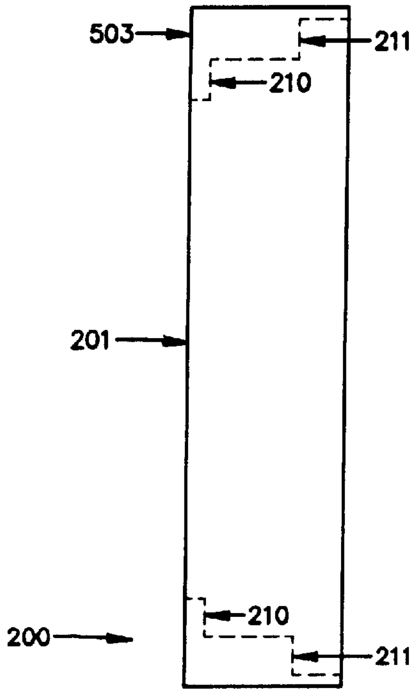
FIG. 5 is a side view of the housing frame component.

As can be seen in FIGS. 5 and 6, the housing frame 200 has interior L-shaped edges projecting rearward from the front surface 503 and away from the edge 203 of the open area 201. As indicated in FIG. 3 and further detailed in FIG. 6, the display template 401 is positioned between the housing frame 200 and rear enclosure 600. The raised portion 403 of the display template 401 substantially fills the open area 201 of the housing frame 200 and is preferably flush with, but can also be slightly raised or recessed from, the front surface 503. The edge portion 403 of the display template 401 is dimensioned to mate with a first vertical edge 210 located behind the front surface 503 of the housing frame 200. Referring to FIG. 3 and FIG. 4, the display template 401 is secured to the housing frame by inserting screws 409 through the countersunk bores 408 and into the blind bores 410.

As indicated in FIG. 3 and detailed in FIG. 6, the housing frame 200 is secured internally to the rear enclosure 600 by inserting anti-rotational studs 507 into the bores 508 and externally by inserting screws 300 through countersunk bores 500 located in the bottom peripheral edge of the housing frame 200 and into blind bores 501 located in the bottom peripheral edge of the rear enclosure 600. The anti-rotational studs 507 and bores 508 are of such dimension that a "snap" tight fit is created when mated together.

In lieu of the anti-rotational studs 507 and bores 508, a second preferred embodiment would achieve internal fastening by applying strips to the front surface 603 of the rear enclosure and second interior vertical edge 211 of the housing frame. The magnetic strips, having opposite polarity, would create an internal bond between the housing frame 200 and rear enclosure 600. Details of this preferred embodiment are not shown in the drawing figures.

In lieu of the anti-rotational studs 507 and bores 508, a third embodiment would achieve internal fastening between the housing frame 200 and rear enclosure 600 by applying a reusable, low bond strength adhesive strip to a second interior vertical edge 211 of the housing frame. The adhesive would mate to the front surface 603 of the rear enclosure. Details of this preferred embodiment are not shown in the drawing figures.

As indicated in FIG. 3, the illuminant 301, consisting of an EL lamp, gas filled tubes or incandescent bulbs, is attached to and partially or fully housed within the rear enclosure 600 and emits light forward through the display template 401 and indicia 202. Wires project through the open slot 302 in the rear enclosure 600 and connect the illuminant to the vehicles wiring system.

As shown in FIG. 6, a plurality of threaded studs 601 are provided as part of and extend rearward of the rear enclosure. Fastening of the emblem is carried out by projecting the free ends of the threaded studs 601 through like-dimensioned and spaced holes in the supporting surface. Mating nuts, not shown, are threaded onto the free ends of the threaded studs 601 to complete the attachment. In lieu of mating nuts, the emblem 100 could be attached directly to the vehicle by placing an adhesive strip between the rear enclosure and supporting surface.

The housing frame 200 and rear enclosure 600 are preferably constructed of hard, durable plastic, but can also consist of various metals. The rear enclosure 600 is generally of the same shape as the housing frame 200, which can be oval, circular, square or any desired shape. The outer surfaces of the housing frame 200 can be plated with metallic substances or painted. The frame can also be constructed of colored translucent or transparent material for illumination when the illuminant 301 is activated.

The display template 401 is preferably similar in shape to the housing frame 200 and constructed of plastic material that can consist of colored translucent, transparent and non-translucent portions. The indicia 202 is preferably molded as part of the display template 401, but can also be painted on or attached with adhesive material. The indicia 202 can consist of colored translucent, transparent and non-translucent portions. The translucent and transparent portions of the display template 401 and indicia allow the passage of light from the illuminant 301.

I claim:

1. An illuminated automotive emblem with replaceable components for attaching to a vehicle comprising:

a housing frame with a peripheral surrounding edge portion having an interior L-shaped cross-section and a front surface surrounding a central open area; said housing frame having a plurality of countersunk bores through the bottom of said peripheral surrounding edge portion; said housing frame having a plurality of blind bores within and along a first vertical edge of said interior L-shaped cross-section and a plurality of interior studs protruding normally and rearward from and along a second vertical edge of said interior L-shaped cross-section; said first vertical edge being located directly behind said front surface of said frame; said first and second vertical edges extend way and rearward of said central open area;

a display template with colored translucent and non-translucent portions bearing indicia with colored translucent and non-translucent portions; said display template is attached as part of said emblem by extending a plurality of interior screws through a plurality of countersunk bores in the outer edge of said display template and into said blind bores of said housing frame; said outer edge of said display template mates to said first vertical edge of said frame; said indicia and a portion of said display template substantially fills said central open area of said frame;

a rear enclosure having a peripheral edge with an illuminant attached in a central area of the front surface; said illuminant is generally in the shape and dimension of and emits light through said display template; said rear enclosure having a plurality of open bores extending through the said front surface to the rear surface at some distance from the outer edge of said illuminant, a plurality of blind bores extending normally from the bottom peripheral edge; said rear enclosure having a plurality of threaded fasteners attached to or molded as part of said rear surface; said rear enclosure attaches as part of said emblem behind said display template by inserting said plurality of interior studs of said housing frame into said open bores of said rear enclosure; said plurality of interior studs and said plurality of bores having such dimensions that a frictional bond is created; said rear enclosure and said housing frame are externally secured together by inserting a plurality of threaded fasteners through said plurality of said countersunk bores through said bottom peripheral edge of said frame and into said blind bores in said bottom peripheral edge of said rear enclosure.

2. The illuminated automotive emblem as defined in claim 1 wherein:

said plurality of interior studs of said frame are a reusable, low bond strength, adhesive strip having a rear surface; said rear surface of said adhesive strip attaches at some point to the said front surface of said rear enclosure.

3. The illuminated automotive emblem as defined in claim 1 wherein:

said plurality of interior studs of said frame are a magnetic strip having a rear surface; said rear surface of said magnetic strip attaches to opposite polarized magnetic material applied at some point to said front surface of said rear enclosure.

4. The illuminated automotive emblem as defined in claim 1 wherein:

said illuminant is an electroluminescent (EL) lamp.

5. The illuminated automotive emblem as defined in claim 1 wherein:

said illuminant is an incandescent bulb.

6. The illuminated automotive emblem as defined in claim 1 wherein:

said illuminant is a gas filled tube.

7. The illuminated automotive emblem as defined in claim 1 wherein:

said illuminant is fiber optic.

8. The illuminated automotive emblem as defined in claim 1 wherein:

said housing frame, said display template and said rear enclosure are plastic; said front surface and said peripheral edge of said frame are exteriorly metallic plated.

9. The illuminated automotive emblem as defined in claim 1 wherein:

said frame is a transparent material.

10. The illuminated emblem as defined in claim 1 wherein:

said housing frame and said rear enclosure are metallic.

11. The illuminated automotive emblem as defined in claim 1 wherein:

said housing frame defines the overall shape of said emblem; said overall shape is one of oval, circular, rectangular, square or polygonal.

* * * * *